Dec. 15, 1925.  
M. P. KIRK  
1,566,103  
APPARATUS FOR PRODUCING ZINC OXIDE  
Filed March 28, 1921
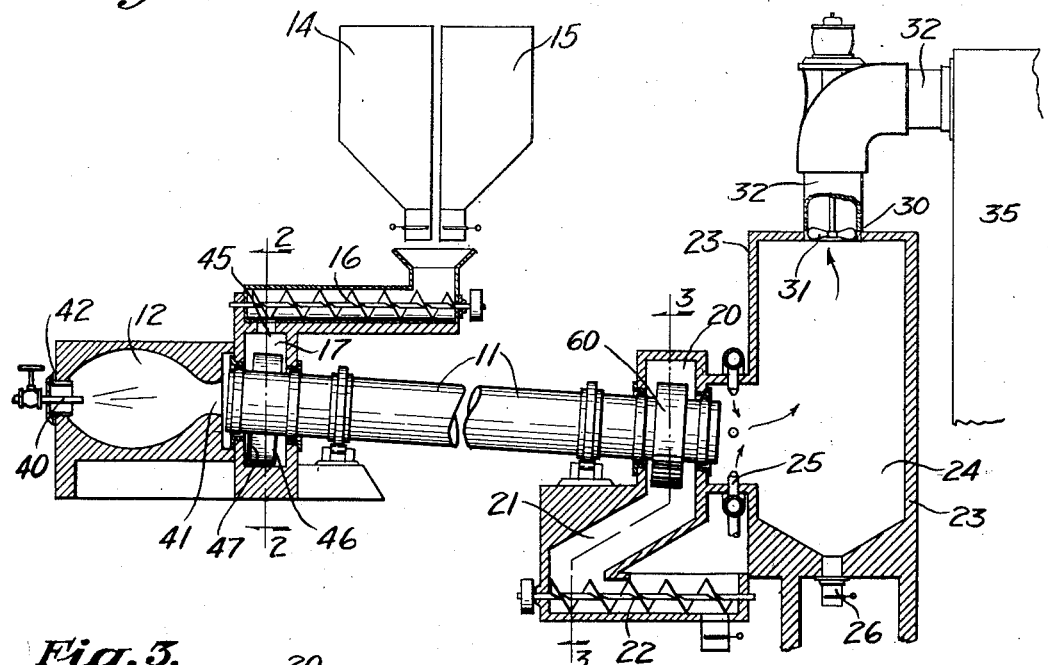
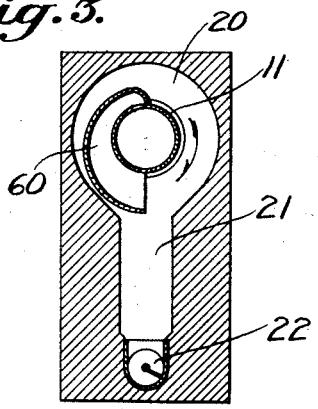
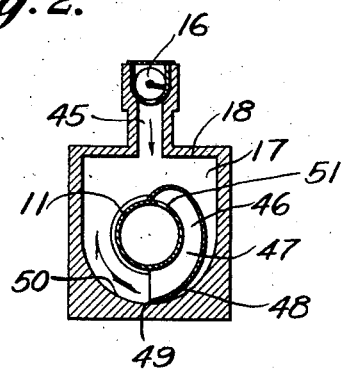
INVENTOR:  
MORRIS P. KIRK,  
BY Graham + Harris  
ATTORNEYS.

Patented Dec. 15, 1925.

1,566,103

UNITED STATES PATENT OFFICE.

MORRIS P. KIRK, OF HARBOR CITY, CALIFORNIA, ASSIGNOR TO KIRK SIMON SMELTING CO., OF MINA, NEVADA, A CORPORATION OF NEVADA.

APPARATUS FOR PRODUCING ZINC OXIDE.

Application filed March 28, 1921. Serial No. 456,256.

*To all whom it may concern:*

Be it known that I, MORRIS P. KIRK, a citizen of the United States, residing at Harbor City, county of Los Angeles, and State of California, have invented a new and useful Apparatus for Producing Zinc Oxide, of which the following is a specification.

This invention relates to apparatus used in the manufacture of zinc oxide.

It is an object of this invention to provide an apparatus for manufacturing zinc oxide or other similar oxides. It is a further object of my invention to provide an apparatus which will be continuous in operation and which will deliver a product of a very high degree of purity.

With reference to the drawing which is of a somewhat diagrammatic nature and for illustrative purposes only:

Fig. 1 is a longitudinal vertical central section of the apparatus I employ in the attainment of the hereinbefore stated objects.

Fig. 2 is a vertical section illustrating the feed arrangement I use and is taken on a plane represented by the line 2—2 of Fig. 1.

Fig. 3 is a vertical section illustrating the arrangement used for discharging the by-products formed by the impurities and absorbents.

As shown in the drawing, I use an apparatus which comprises essentially an inclined rotary kiln 11; a furnace 12 adapted to supply heat to the interior of the kiln 11; hoppers 14 and 15 from which the materials to be treated are delivered through a screw conveyor 16 to the feed bowl 17 which surrounds the forward portion of the kiln 11; a discharge cowl 20 surrounding the rearward portion of the kiln 11 and adapted to deliver the by-product mixtures through a spout 21 to a screw conveyor 22; and walls 23 to form a combustion chamber 24 provided with air nozzles 25, a dust discharge spout 26, and an outlet 30 in which is located an exhaust fan 31 which forces the combustion products of the chamber 24 through a flue forming structure 32 to a bag house 35, or other means of handling the product.

The furnace 12 is of a type to cause the very complete combustion of either gas or oil supplied through a suitable burner 40, and the walls of the furnace converge as indicated at 41 to form a throat through which the combusted gases are delivered into the kiln 11. The burner 40 extends within the furnace through a fire door 42 which is provided with suitable air regulating means for regulating combustion.

In the approximate center of the covering structure 18 of the feed bowl 17 is formed an aperture 45 through which the materials delivered by the conveyor 16 are dropped into the bowl 17. Upon that portion of the kiln 11 acting within the bowl 17 is mounted a scoop 46 comprised of side walls 47 and a wall 48 extending from the exterior of the kiln, and a lip 49 is thereby formed having wiping contact with the bottom 50 of the bowl 17, whereby such materials delivered into the bowl are picked up as the kiln revolves in the direction of the indication arrow in Fig. 2, and are transferred into the kiln 11 through an opening 51. Upon the opposite end of the kiln 11 is placed a discharge scoop 60, similar to the scoop 46 but oppositely arranged which discharges the by-products from the treatment carried on within the kiln into the spout 21 leading to the discharge conveyor 22.

In the operation of the apparatus zinc ore containing oxides and other impurities is delivered from the hopper 14 to the conveyor 16 where it is mixed by the action of the screw of the conveyor with coke or other carbonaceous material which is delivered into the conveyor 16 from the hopper 15. The mixture formed in the screw conveyor 16 is dropped into the feed bowl 17 and is delivered from there into the kiln 11 by the scoop 46. Within the kiln, the mixture is subjected to the heat of the non-oxidizing combustion gases delivered thereinto from the furnace 12 and the interior heat of the kiln is maintained at a temperature ranging from 750 to 1500° C. which is sufficient to cause the volatilization of the zinc elements in the mixture. The material then takes up the oxygen from the oxides and also takes up other impurities which, with such other foreign substances as may exist in the ore, are discharged through the scoop 60 to the discharge conveyor. Metallic zinc vapors are formed within the kiln and due to the action of the exhaust fan 31 and the combustion gases entering from the furnace, these zinc vapors are delivered into the combustion chamber 24 wherein the zinc vapors in a superheated condition are subjected to a blast of air from the nozzles 25 and combustion takes place between the zinc vapors and the oxygen of the admitted air and zinc oxide fumes are produced. These zinc oxide fumes are then exhausted by the fan 31 and are delivered thereby to the bag house 35 where the finely divided portions of zinc oxide are deposited in a condition ready for commercial use.

I claim as my invention:

1. An apparatus for producing zinc oxide from zinc compounds which comprises; an inclined rotary kiln; means for mixing the zinc compound with carbonaceous material and feeding it into the upper end of said kiln; means for passing hot reducing gases through said kiln in the same direction that said zinc compound travels; means for discharging solid material from the lower end of said kiln; a zinc combustion chamber into which the zinc fumes from said kiln are passed; means for passing air into said zinc combustion chamber; and means for withdrawing the zinc oxide fumes from said zinc combustion chamber.

2. An apparatus for producing zinc oxide from zinc compounds which comprises; an inclined rotary kiln; means for mixing the zinc compound with carbonaceous material and feeding it into the upper end of said kiln; means for passing reducing gases at a temperature in excess of 750° C. into said kiln in the same direction that said zinc compound travels; means for discharging solid material from the lower end of said kiln; a zinc combustion chamber into which the zinc fumes from said kiln are passed; means for passing air into said zinc combustion chamber; and means for withdrawing the zinc oxide fumes from said zinc combustion chamber.

3. An apparatus for producing zinc oxide from zinc compounds comprising: hoppers for respectively holding zinc compounds and carbonaceous material; a screw conveyor below said hoppers into which said hoppers discharge; an inclined rotary kiln below said conveyor into the upper end of which said conveyor discharges; means for passing hot reducing gases through said kiln in the same direction as the zinc compound travels; means for discharging solid material from the lower end of said kiln; a zinc combustion chamber into which the zinc fumes from said kiln are passed; means for passing air into said zinc combustion chamber; and an exhaust fan for withdrawing the zinc oxide fumes from said zinc combustion chamber.

4. An apparatus for producing zinc oxide from zinc compounds comprising: hoppers for respectively holding zinc compounds and carbonaceous material; a screw conveyor below said hoppers into which said hoppers discharge; a feed bowl into which said conveyor discharges; a discharge cowl; an inclined rotary kiln mounted with its upper end in said feed bowl and its lower end in said discharge cowl; a scoop on the upper end of said kiln within said feed bowl for scooping the material from said feed bowl into said end of said kiln; a discharge scoop on the lower end of said kiln for discharging the solid residue from the kiln into said discharge cowl; means for passing hot reducing gases through said kiln in the same direction as the materials travel; a zinc combustion chamber into which the zinc fumes from said kiln are discharged; means for introducing air into said combustion chamber; and means for withdrawing the zinc oxide fumes from said zinc combustion chamber.

In testimony whereof, I have hereunto set my hand at Los Angeles, California, this 22nd day of March, 1921.

MORRIS P. KIRK.